US011756366B2

(12) United States Patent

Crawford et al.

(10) Patent No.: US 11,756,366 B2

(45) Date of Patent: Sep. 12, 2023

(54) MODULAR VENDING MACHINES

(71) Applicant: PepsiCo, Inc., Purchase, NY (US)

(72) Inventors: Robert Crawford, Yorktown Heights, NY (US); Emad Jafa, Brewster, NY (US); Cheuk Chi Lau, White Plains, NY (US); Xuejun Li, White Plains, NY (US); Yong Serock, Newton, CT (US); Wai Ting Chan, Cambridge (GB); Samuel Luke Johnstone, Cambridge (GB); Martyn Thomas Mitchell, Royston (GB); Euan Morrison, Cambridge (GB); Erik David Williams, Cambridge (GB)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 16/206,474

(22) Filed: Nov. 30, 2018

(65) Prior Publication Data

US 2020/0175802 A1 Jun. 4, 2020

(51) Int. Cl.

*G07F 9/00* (2006.01)
*G07F 11/00* (2006.01)
(Continued)

(52) U.S. Cl.

CPC ............ *G07F 9/002* (2020.05); *G07F 11/007* (2013.01); *G07F 5/18* (2013.01); *G07F 11/16* (2013.01); *G07F 17/12* (2013.01); *G07F 17/14* (2013.01)

(58) Field of Classification Search

CPC ...... A47F 9/048; G06Q 20/204; G06Q 20/20; G06Q 20/18; G07F 11/002; G07F 5/02;
(Continued)

(56) References Cited

U.S. PATENT DOCUMENTS 6,535,983 B1 * 3/2003 McCormack ........... H04L 12/10 370/410
2003/0130762 A1 7/2003 Tomassi
(Continued)

FOREIGN PATENT DOCUMENTS

CN 208521376 U * 2/2019
WO WO 2016/130552 A1 8/2016
WO WO 2017/165658 A1 9/2017

OTHER PUBLICATIONS

USDA, FDA Requirement for Vending Machines, Mar. 2, 2016, all pages.*

(Continued)

*Primary Examiner* — Thien T Mai

(74) *Attorney, Agent, or Firm* — Sterne, Kessler, Goldstein & Fox P.L.L.C.

(57) ABSTRACT

Modular vending machines for storing and dispensing products to consumers. A modular vending machine may include a product storage system, a user interface, and a control unit. Several modular vending machines may be stacked and/or arranged together in various configurations. Several modular vending machines may be linked electronically and may communicate with each other and/or with a user mobile device over a network. A modular vending machine may automatically complete a transaction with the consumer, where the consumer removes a product from the modular vending machine. A consumer may access and purchase products from several modular vending machines in one transaction.

19 Claims, 13 Drawing Sheets

(51) Int. Cl.

| | |
|---|---|
| ***G07F 17/12*** | (2006.01) |
| ***G07F 17/14*** | (2006.01) |
| ***G07F 11/62*** | (2006.01) |
| ***G07F 5/18*** | (2006.01) |
| *G07F 11/16* | (2006.01) |

(58) Field of Classification Search

CPC .......... G07F 11/44; G07F 17/12; G07F 11/62; G07F 19/20; G07F 11/36; G07F 19/211; G07F 17/18; G07F 17/0042; G07F 9/02; G07F 13/025; G07F 13/065; G07F 19/209; G07F 7/02; G07F 9/002; G07F 9/026; G07F 17/0078; G07F 17/0014; G07F 11/00; G07F 11/24; G07F 11/165; G07F 11/02; G07F 11/16; G07F 11/007; G07F 9/0235; G07G 1/0036; A47B 87/007

See application file for complete search history.

(56) References Cited

U.S. PATENT DOCUMENTS

| | | | | |
|---|---|---|---|---|
| 2004/0249711 | A1* | 12/2004 | Walker ............. | G06Q 10/06375 700/231 |
| 2005/0252926 | A1* | 11/2005 | Atsuta ..................... | G07F 11/62 221/155 |
| 2007/0170201 | A1* | 7/2007 | Steffens ................ | G07F 7/0609 221/265 |
| 2008/0269947 | A1* | 10/2008 | Beane .................... | G06Q 20/12 700/241 |
| 2011/0022980 | A1 | 1/2011 | Segal et al. | |
| 2012/0004769 | A1* | 1/2012 | Hallenbeck ............. | G07F 11/62 700/232 |
| 2014/0053950 | A1* | 2/2014 | Vandersteen ........... | G07F 9/002 222/2 |
| 2014/0316916 | A1* | 10/2014 | Hay ....................... | G06Q 20/20 705/17 |
| 2016/0364930 | A1* | 12/2016 | Chalise .................. | G05B 15/02 |
| 2017/0140600 | A1 | 5/2017 | Halsey, Jr. et al. | |
| 2018/0108203 | A1 | 4/2018 | Li et al. | |

OTHER PUBLICATIONS

Sharkey et al., "Disability, Virtual Reality and Associated Technologies" (Year: 2002).*

Solano et al., "Smart vending machines in the era of internet of things" (Year: 2016).*

International Search Report and Written Opinion of the International Searching Authority in International Application No. PCT/US2019/062646, dated Jan. 16, 2020, 14 pages.

European Search Report in European Application No. 19890643.0, dated Jul. 21, 2022 (12 pages).

* cited by examiner

MODULAR VENDING MACHINES

FIELD

The described embodiments generally relate to product dispensers, such as vending machines. In particular, embodiments relate to modular vending machines and systems of modular vending machines.

BACKGROUND

Vending machines enable consumers to purchase a variety of products, such as foods, beverages, or other consumable goods on demand. As an alternative to some retail environments offering similar products for sale (such as, for example, convenience stores or kiosks), vending machines have a number of advantages. For example, some vending machines do not require the presence of an employee to complete a transaction, thereby lowering operating costs and making the machines an inexpensive means for selling goods to consumers.

BRIEF SUMMARY OF THE INVENTION

Some embodiments provide modular vending machines that may operate independently or together with other modular vending machines as a system. They allow a user to conveniently purchase multiple products with only one transaction. Some embodiments also provide modular vending machines that may be arranged and/or stacked together to efficiently utilize available space. Methods of vending a product from a modular vending machine are also described herein.

For example, embodiments include a modular vending system, where the modular vending system includes a first modular vending unit having a first product compartment. The first modular vending unit may also include a first locking mechanism that is operably accessible to a user through a first door, and a first product sensor that is configured to determine the number of products disposed in the first product compartment. The first modular vending unit may also include a user interface configured to receive user information. The modular vending system may also include a second modular vending unit having a second product compartment. The second modular vending unit may also include a second locking mechanism that is operably accessible to a user through a second door, and a second product sensor configured to determine the number of products disposed in the second product compartment. Further, when user information is received by the user interface of the first modular vending unit, both the first and second doors are unlocked.

Embodiments also include a modular vending machine having a first product compartment and a second product compartment that is separate from the first product compartment. A first locking mechanism may be configured to automatically lock and unlock a first door of the first product compartment, and a second locking mechanism may be configured to automatically lock and unlock a second door of the second product compartment. The modular vending machine may also include a user interface configured to receive information from a user and a product sensor system configured to determine the number of products disposed in the first and second product compartments. During a vending operation, both the first and second product compartments are accessible to a user through the first and second doors, respectively, and only one of the first and second doors may be opened at a time.

A method of vending a product from a modular vending machine may include receiving user information from a user, determining the number of products in a first product compartment and in a second product compartment, unlocking a first door and a second door whereby the user may access the first product compartment and the second product compartment, respectively. The method may also include locking the second door when the first door is opened, unlocking the second door when the first door is closed, and then locking both the first door and the second door. Then, after both doors have been locked, determining the number of products that were removed from the first product compartment and the second product compartment.

BRIEF DESCRIPTION OF THE FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

DETAILED DESCRIPTION OF THE INVENTION

Figure 1:
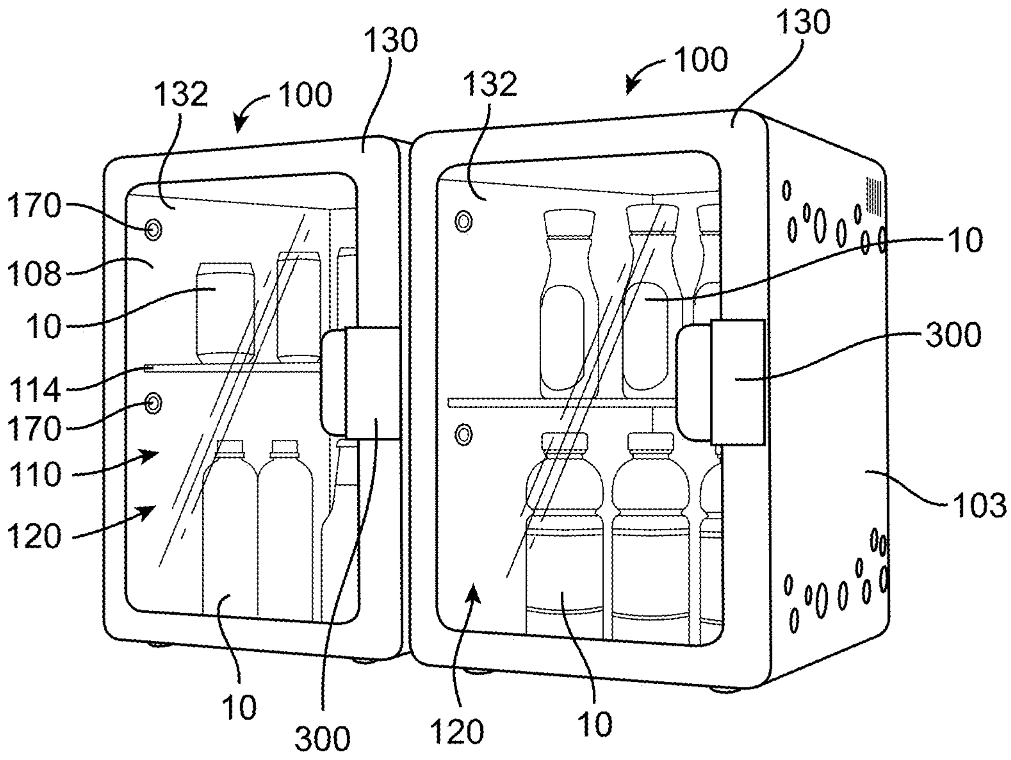
FIG. 1 is a front perspective view of modular vending machines according to embodiments.

The present invention(s) will now be described in detail with reference to embodiments thereof as illustrated in the accompanying drawings. References to “one embodiment”, “an embodiment”, “an exemplary embodiment”, etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The consumer appeal and profitability of some vending machines may be significantly correlated with the vending machine's ability to serve consumers in a convenient and efficient manner. One measure of a vending machine's convenience may be the location of the vending machine relative to areas of convenience for consumers, such as high-traffic areas. Due to certain size and/or infrastructure requirements, however, some vending machines may be limited to placement in areas that are not in high-traffic areas, thus requiring consumers to travel out of their way to purchase goods from the vending machine. Another measure of a vending machine's convenience may be the speed and efficiency of completing a transaction with the vending machine. For example, some vending machines require consumers to separately complete transactions for each product purchased, which may increase the amount of time it takes a user to purchase multiple products. Further, some vending machines do not allow a user to see and/or handle a product before purchasing the product, which may decrease consumer satisfaction.

Embodiments as described herein include modular vending machines for storing and dispensing products to consumers. The modular vending machines may be used independently, or may be physically or electronically connected together with other modular vending machines such that they operate together as a system. The modular vending machines may be smaller than some existing vending machines, which may allow them to be placed in areas of convenience for consumers such as, for example, tables and/or countertops. Likewise, the modular vending machines may be placed in a number of different arrangements in order to efficiently utilize available space.

In some embodiments, the modular vending machines may include doors through which users may access product compartments containing a variety of different products, and may allow the user to handle, examine, remove, and/or return the products before purchasing. The modular vending machines may also include product removal sensors which automatically determine which product(s) a user has removed such that the user may be charged accordingly. In this manner, a user may not be required to complete multiple transactions to purchase multiple products, which may increase the vending machine's efficiency and, accordingly, consumer satisfaction.

The modular nature of some vending machines as described herein may also decrease the upfront costs associated with installing a vending machine. For example, a vending machine operator may first install one small modular vending machine, which may be less expensive than some existing vending machines. Then, if necessary, the operator may later add additional modules to increase product storage capacity. In this manner, the existing infrastructure need not be replaced, but may be added to in proportion with consumer demand.

Figure 2:
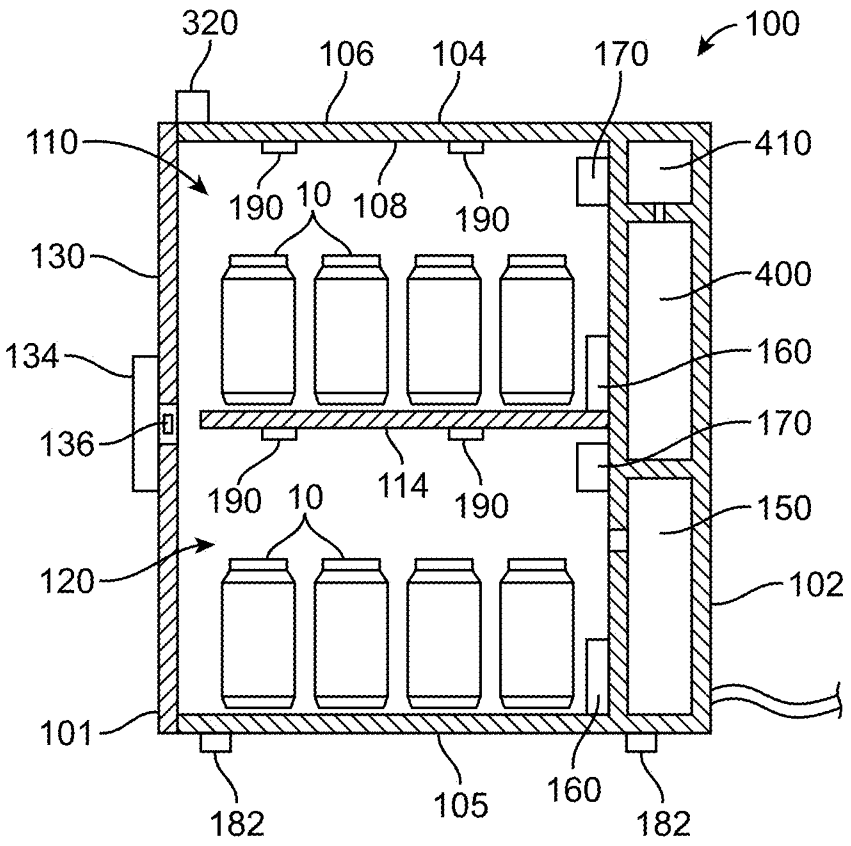
FIG. 2 is a sectional view of a modular vending machine according to embodiments.
Figure 3:
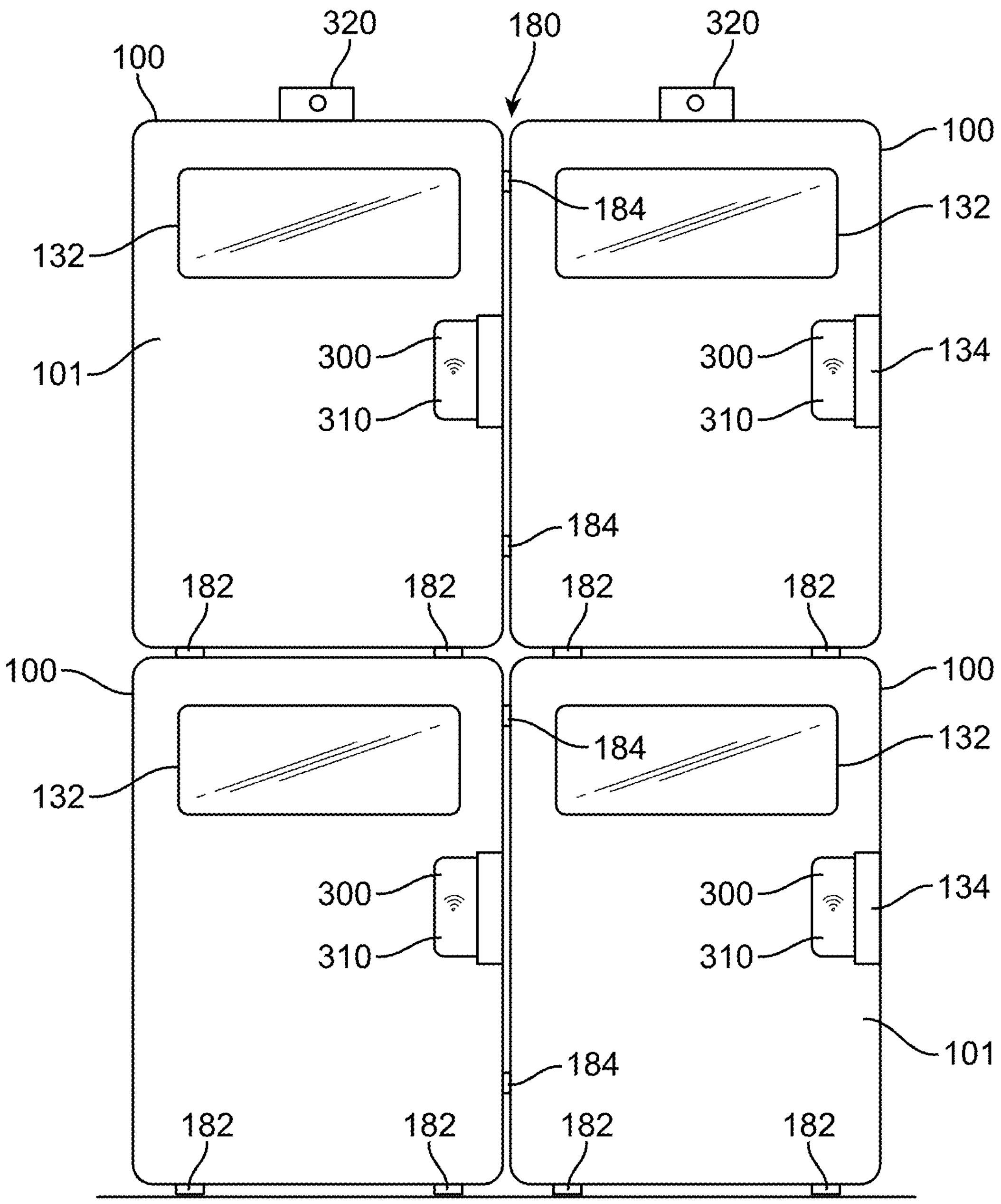
FIG. 3 is a front view of modular vending machines according to embodiments.

Embodiments will now be described in more detail with reference to the figures. With reference to FIGS. 1-3, a modular vending machine 100 may include a product storage system 110, a user interface 300, and a control unit 400. As described in further detail below, several modular vending machines 100 may be mechanically and/or electronically connected and may operate together as a system.

Product storage system 110 is configured to store and/or display one or more products 10 to be vended to a user. Products 10 may include perishable and non-perishable products. Products 10 may include, but are not limited to, chips, candy bars, soft drinks, water, carbonated water, juices, alcoholic beverages, sports drinks, pre-made packaged goods, fresh food items, or other suitable products. In some embodiments, products 10 may include convenience items, medicine, toiletries, electronic devices, or other suitable non-perishable products.

Product storage system 110 may include a product compartment 120 defined by an interior surface 108. Products 10 may be placed and/or stored within product compartment 120. In some embodiments, product storage system 110 may include a shelf 114 configured to hold and/or store products 10 within product compartment 120. As shown in FIGS. 1 and 2, for example, shelf 114 may be disposed horizontally in product compartment 120. In some embodiments, more than one shelf 114 may be disposed in product compartment 120 (see, for example, FIG. 7). In some embodiments, product storage system 110 may include lights 190 configured to illuminate product compartment 120 or a portion of product compartment 120.

As shown, for example, in FIGS. 1 and 2, shelf 114 may extend partially across product compartment 120 such that the areas above and below the shelf are not thermally isolated from each other, for example. In some embodiments, shelf 114 may be configured to divide the space defined by interior surface 108 into two adjacent product compartments 120. In some embodiments, shelf 114 may be insulated to reduce the exchange of heat between adjacent product compartments 120.

In some embodiments, each product compartment 120 may store different kinds of products 10. For example, non-perishable products 10 may be stored in one product compartment 120, and perishable products 10 may be stored in another product compartment 120. In some embodiments, products 10 that are preferably served at a temperature other than room temperature may be stored in one product compartment 120, and products 10 that are preferably served at room temperature may be stored in another product compartment 120. In some embodiments, all of the products 10 stored in product compartment 120 may be of the same type, weight, volume, and/or cost.

A temperature control system 150 may be used to control the temperature of product compartment 120 of product storage system 110 by, for example, removing or adding heat to product compartment 120. In some embodiments where modular vending machine 100 has multiple product compartments, one product compartment 120 may be temperature controlled, and another product compartment 120 may not be temperature controlled. In some embodiments where modular vending machine 100 has multiple product compartments, all product compartments 120 may be temperature controlled.

Figure 4A:
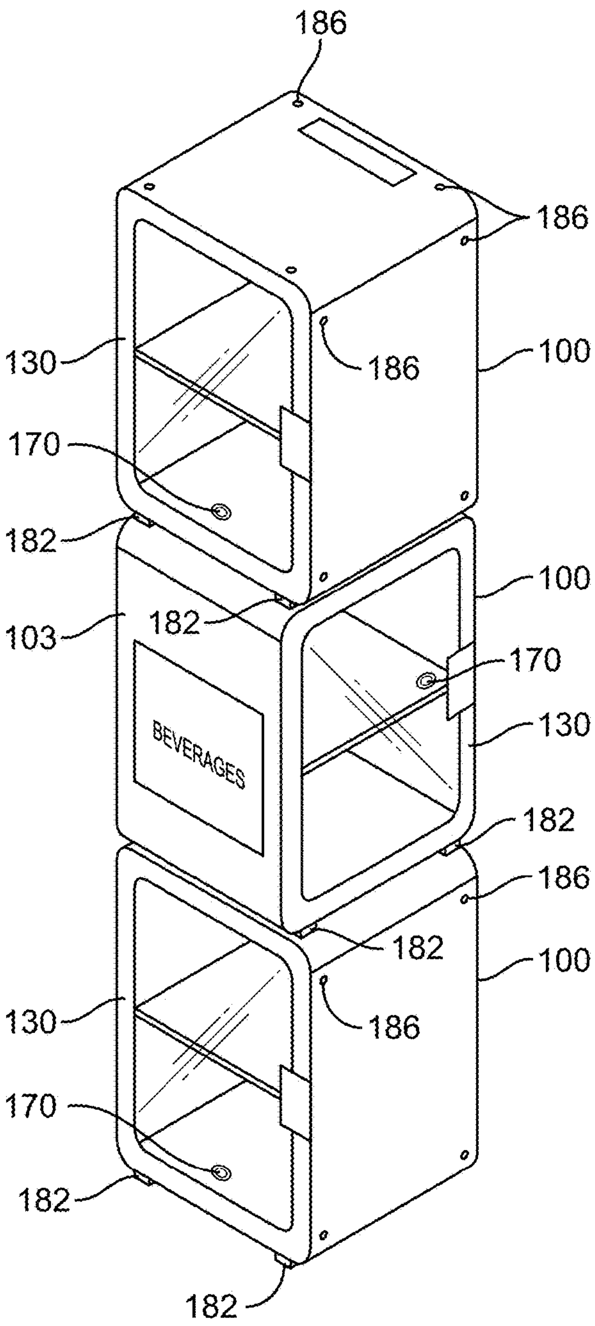
FIG. 4A is a top front perspective view of modular vending machines according to embodiments.
Figure 4B:
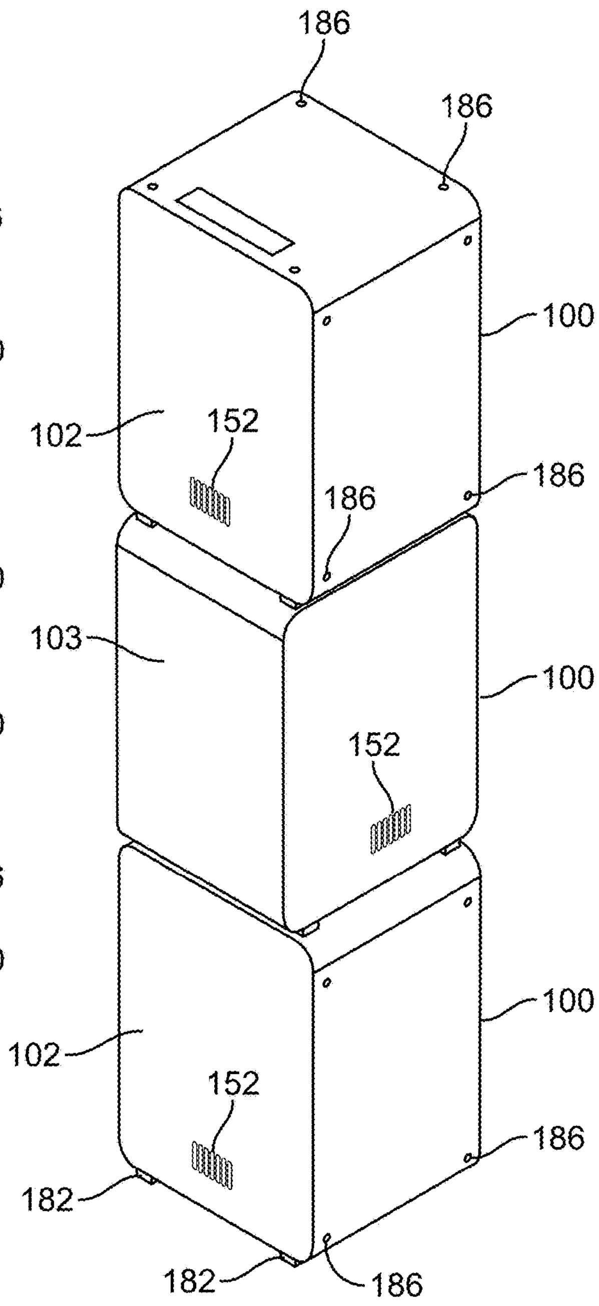
FIG. 4B is a top rear perspective view of the modular vending machines of FIG. 4A.

Temperature control system 150 may be, for example, a thermoelectric cooler, a refrigeration system, or other powered cooling system. In some embodiments, temperature control system 150 may be a passive cooling system such as, for example, ice, an ice pack, cool pack, or other thermal capacitor capable of absorbing considerable amounts of heat. Temperature control system 150 may be a thermoelectric heater, heat pump, or other powered heating system. In some embodiments, temperature control system 150 may be a passive heating system such as, for example, a heat pack, chemical heat pack, or other thermal capacitor capable of releasing considerable amounts of heat. In some embodiments, modular vending machine 100, or a portion of modular vending machine 100, may include a thermally insulating material to reduce the exchange of heat between product compartment 120 and the ambient conditions surrounding modular vending machine 100. In some embodiments, a layer of air may be sealed between an exterior surface 106 and the interior surface 108 to act as a thermal insulator. As shown in FIG. 4B, for example, a vent 152 may be disposed in a rear 102 of modular vending machine 100. Heat from product compartment 120 may be expelled to the environment or absorbed from the environment by temperature control system 150 through vent 152.

Products 10 that are stored in product storage system 110 may be arranged into rows, columns, and/or stacks within product compartment 120. In some embodiments, products 10 need not be organized in a particular manner and may be placed in product storage system 110 in various arrangements.

Modular vending machine 100 may include a product door 130 whereby a user may access product compartment 120 and products 10 during a vending operation. Product compartment 120 may also be filled or refilled through product door 130 with products 10 to be vended. In some embodiments, product door 130 may be disposed on a front 101 of modular vending machine 100. In some embodiments, product door 130 may be disposed on a side 103, a top 104, or other portion of modular vending machine 100.

In some embodiments, product door 130 may include a lock 136 and may be locked such that only authorized users may access product compartment 120. As described in further detail below, in some embodiments, product door 130 may be selectively accessible by a user during a vending operation. In some embodiments, modular vending machine 100 may include multiple product doors 130 whereby a user may access product compartment 120 and products 10. In some embodiments, product door 130 may include a window 132 whereby a user may see into product compartment 120 while product door 130 is in a closed and/or position. In some embodiments, product door 130 may include a handle 134 whereby a user may pull to open product door 130.

In some embodiments, product storage system 110 may include product moving components 160 for moving, adjusting, or arranging products 10 in product storage system 110. Product moving components 160 may be used, for example, to move products 10 toward product door 130 as the products nearest the door are removed during vending operations such that the visibility and/or accessibility of the remaining products is improved. In some embodiments, product moving components 160 may include, for example, a coil that displaces products 10 when rotated, a conveyer system that linearly displaces products 10, a hydraulic, pneumatic, or electrical actuator that pushes or pulls products 10, or a robotic implement configured to lift, hold, and/or transport products 10. In some embodiments, product moving components 160 may include a passive biasing system such as, for example, a spring that imparts force on products 10 to move them in a certain direction.

In some embodiments, modular vending machine 100 may include feet 182 that are disposed on a bottom 105 of modular vending machine 100. Feet 182 may be used to support modular vending machine 100 above the ground or another supporting surface, for example, or to connect modular vending machine 100 to another modular vending machine 100, as described in further detail below.

Product storage system 110 may include one or more product removal sensors 170 configured to determine the types and quantities of products 10 that are removed from product compartment 120 during a vending operation. Product removal sensors 170 may communicate with control unit 400. In some embodiments, product removal sensor 170 may be a component of an automatic identification and data capture ("AIDC") system for automatically identifying products 10. In some embodiments, product removal sensor 170 may be a radio-frequency identification ("RFID") reader and each product 10 in product compartment 120 may include an RFID tag containing information about the respective product 10, which may be read by product removal sensor 170 when products 10 are removed. In some embodiments, product removal sensor 170 may be a bar code scanner, image sensor, optical character recognition sensor, or the like, that is configured to determine the types and quantities of products 10 removed from product compartment 120 based on the appearance of products 10 or based on information (for example, a bar code or text) disposed on the surface of products 10. In some embodiments, product removal sensor 170 may measure the weight of products 10 stored in product compartment 120 and use a measured change in weight of the products 10 to determine the types and quantities of products 10 that were removed. In some embodiments, product removal sensor 170 may include the same features of and operate in the same manner as the weight sensors described in U.S. Pat. No. 9,406,187, the disclosure of which is incorporated herein in its entirety by reference thereto. In some embodiments, product removal sensor 170 may include sensors configured to detect the presence or absence of products 10 in product compartment 120. For example, in some embodiments, product removal sensor 170 may include ultrasonic sensors respectively disposed in proximity to respective products 10 stored in product compartment 120. When a product 10 is disposed in proximity to an ultrasonic sensor, the sensor may sense the presence of the product 10. When a product 10 is moved away from the ultrasonic sensor, the sensor may sense the absence of the product 10.

During a vending operation, product removal sensor 170 may use a measured change in the number of products 10 in product compartment 120 to determine the types and quantities of products 10 that were removed. Similarly, in some embodiments, product removal sensor 170 may include infrared light gates, which may include an infrared source and an infrared sensor. When a product 10 is disposed between the infrared source and the infrared sensor, the infrared light from the source may not reach the infrared sensor, indicating that the product 10 is present. When a product 10 is removed from between the infrared source and the infrared sensor, the infrared light from the source may reach the infrared sensor, indicating that the product 10 is absent. During a vending operation, product removal sensor 170 may use a measured change in the number of products 10 in product compartment 120 to determine the types and quantities of products 10 that were removed.

In some embodiments, product removal sensor 170 may also sense when a product is returned to product compartment 120. In this manner, a user may remove, examine, and return a product 10 to the product compartment without being charged for the product 10.

Product removal sensor 170 may be disposed in various locations within product compartment 120. As shown in FIGS. 1, 2, and 4A, for example, product removal sensor 170 may be disposed in various locations on interior surface 108 in proximity to the front rear, top, bottom, or sides of the modular vending machine. In some embodiments, product removal sensor 170 may be disposed under shelf 114. In some embodiments, product removal sensor 170 may be disposed on shelf 114. In some embodiments, product removal sensor 170 may be disposed on or in door 130 (see, for example, FIG. 7).

In some embodiments, user interface 300 may include a touch screen display for receiving user input and communicating information to the user. In some embodiments, user interface 300 may include electromechanical buttons for receiving input from a user. In some embodiments, user interface 300 may include a visual display for communicating with or displaying information to a user. In some embodiments, user interface 300 may include a combination of touch screens, electromechanical buttons, and/or visual displays. User interface 300 may display information about products 10 in product storage system 110. User interface may include lights or icons, for example, to indicate whether product door 130 is locked or unlocked and/or the status of a transaction with a user. User interface 300 may include a means for accepting payment from a user (e.g., a bill validator, coin slot, or credit card reader). In some embodiments, user interface 300 may be configured to accept payment using a digital wallet service and/or a mobile payment service.

With reference to FIG. 3, user interface 300 may include an item scanner 310, which may include one or more readers or scanners for reading a machine readable item, which may be used for identifying a customer or identifying payment information, for example. Machine readable items may include, but are not limited to, a barcode, a magnetic strip, a quick response (QR) code, a radio frequency identification (RFID) tag, a Bluetooth-enabled device (e.g., a cell phone), a Bluetooth Low Energy (BLE) device, or an ultrasound communication device, (e.g., a device having LISNR® ultrasound technology).

User interface 300 may include a biometric scanner 320 configured for identifying one or more biometric characteristics of a customer. Biometric scanner 320 may include, for example but not limited to, a fingerprint reader, a finger vein scanner, a retinal scanner, an iris scanner, a camera (for taking a photo and/or recording a video), or a microphone. The biometric characteristic(s) of a customer may include a fingerprint, a finger vein pattern, a retinal profile, an iris profile, a face profile, and a voice profile.

Figure 9:
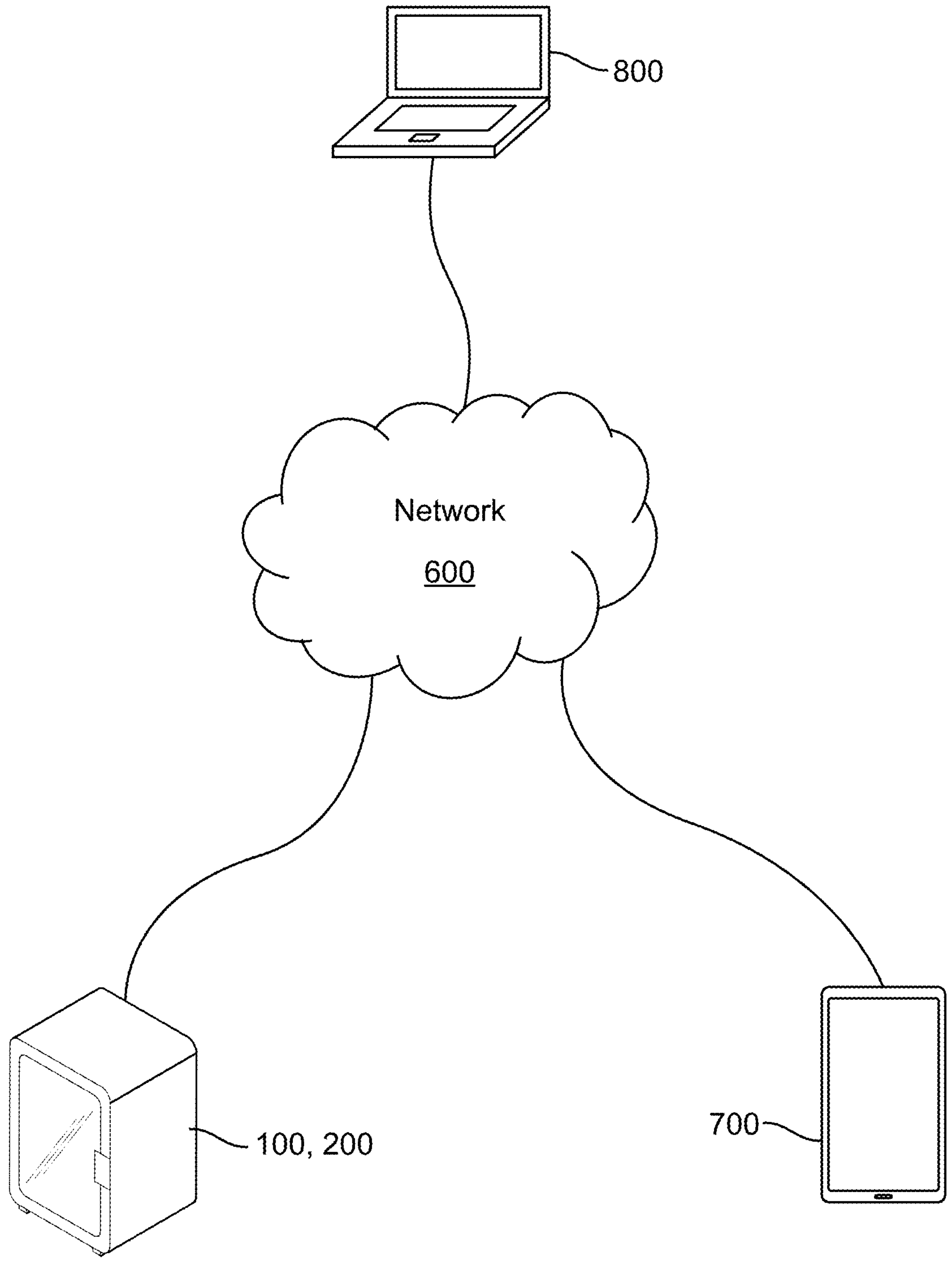
FIG. 9 depicts an exemplary network environment suitable for use and interconnection of exemplary components described herein, according to embodiments.

With references to FIGS. 2 and 9, control unit 400 may be configured to enable the modular vending machine 100 to operate and complete transactions automatically, which is to say without direct human intervention. In some embodiments, control unit 400 may control all aspects of modular vending machine 100.

Control unit 400 may include a transceiver 410 that is configured to send and receive information wirelessly. Transceiver 410 may allow control unit 400 to connect to a network 600, which may include, for example, a Wireless Local Area Network ("WLAN"), Campus Area Network ("CAN"), Metropolitan Area Network ("MAN"), or Wide Area Network ("WAN"). Transceiver 410 may be configured to operate on a variety of frequencies, such as Very High Frequency or Ultra High Frequency ranges, and may be compatible with specific network standards such as cell phone, WIFI™, or BLUETOOTH® wireless networks, for example. In some embodiments, control unit 400 may connect to network 600 through a wired connection such as, for example, an Ethernet cable.

As exemplified in FIG. 9, modular vending machine 100 may communicate with a user mobile device 700 over network 600. User mobile device 700 may be, for example, a cell phone, smart phone, tablet, laptop, personal computer, or other computing device capable of connecting to network 600 through a wired or wireless connection. In some embodiments, user mobile device 700 may connect directly to modular vending machine 100. In some embodiments, an administrator device 800 may also be connected to network 600, and may be used to monitor and/or send information between user mobile device 700 and modular vending machine 100. Administrator device 800 may be configured to manage user accounts, vending machine inventory, as well as to process transactions. Modular vending machine 100 may notify administrator device 800 when product inventory is low and may need to be refilled. Administrator device 800 may be able to connect to control unit 400 remotely, in order to control the functions of the vending machine or to diagnose technical issues, for example.

Administrator device 800 may be configured to authenticate a customer based on the machine readable item identified by item scanner 310 or the biometric characteristic(s) identified by biometric scanner 320. After authenticating a customer, administrator device 800 may associate the authenticated customer with a customer account. In some embodiments, administrator device 800 may locate a particular customer account in a database based on the machine readable item identified by item scanner 310. In some embodiments, administrator device 800 may locate a particular customer account in a database based on the biometric characteristic(s) identified by biometric scanner 320. Administrator device 800 may locate a particular customer account by comparing identified biometric characteristic(s) of a customer against a database of authorized biometric characteristics.

User mobile device 700 may include an application configured to receive information from and send information to modular vending machine 100. In some embodiments, user mobile device 700 may be configured to display information such as, for example, user account information, a list of products available for purchase and their prices, nutritional information of products, images of products available for purchase, and/or a summary of the transaction. In some embodiments, a user may be required to log in to an application (e.g., by providing a user name and/or password) on user mobile device 700 before interacting with or completing a transaction with modular vending machine 100.

Control unit 400 and/or administrator device 800 may include memory for storing information about modular vending machine 100 and/or user mobile device 700. This information may include, for example, product information, modular vending machine information, user information, transaction locations, transaction times, and/or other information. In some embodiments, the information may include a user's dietary restrictions, dietary preferences, or allergens.

In some embodiments, one or both of control unit 400 and/or administrator device 800 may maintain a list of products 10 available for sale in modular vending machine 100. The list may be manually or automatically updated, for example, after modular vending machine 100 has been loaded or reloaded with products 10, or after a product 10 has been vended to a user.

During a vending operation according to some embodiments, a user may approach modular vending machine 100. In some embodiments, before unlocking product door 130, the user may be required to provide payment information using user interface 300. In some embodiments, before unlocking product door 130, the user may be required to confirm his/her identity. For example, a user may be required to enter on user interface 300 an access code provided on user mobile device 700, or item scanner 310 may read a machine readable item displayed on user mobile device 700. In some embodiments, before unlocking product compartment door 130, the modular vending machine may automatically confirm the user's identity, for example, using biometric scanner 320 to verify the user's biometric characteristic(s). After product door 130 has been unlocked, the user may access product compartment 120 and remove products 10. In some embodiments, lights 190 may illuminate whenever product door 130 is unlocked, and may then remain illuminated until the transaction is completed with the user. Product removal sensor 170 may sense the types and quantities of products 10 removed by the user from product compartment 120. In some embodiments, the transaction with the user will automatically be completed when the user closes product door 130. In some embodiments, the user may manually complete the transaction, for example, by indicating on user interface 300 and/or user mobile device 700 that he/she has finished removing the products to be purchased. Then, the user may provide payment for products 10 using user interface 300 and/or user mobile device 700.

Figure 5:
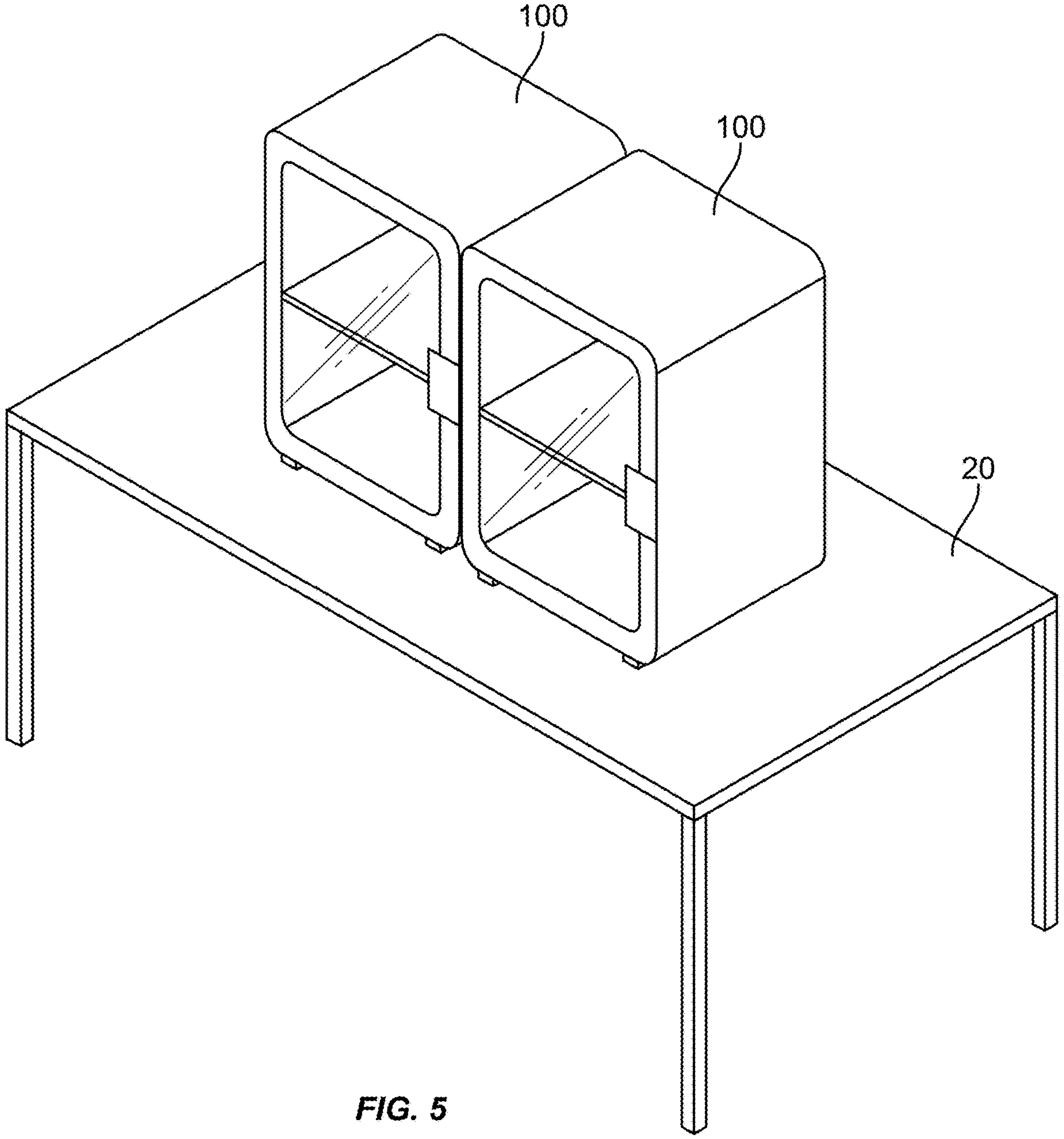
FIG. 5 is a top front perspective view of modular vending machines according to embodiments.
Figure 6:
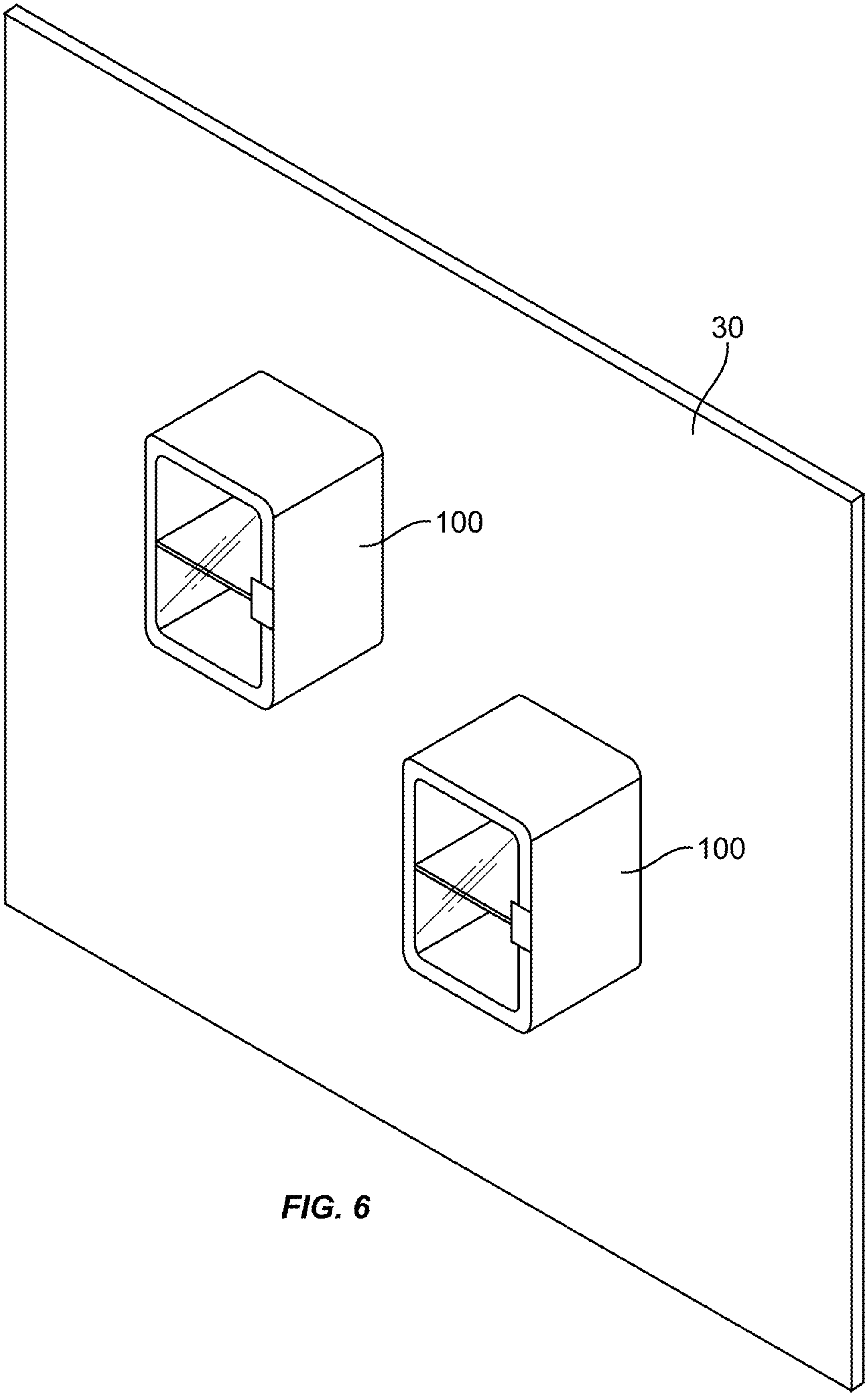
FIG. 6 is a top front perspective view of modular vending machines according to embodiments.
Figure 7:
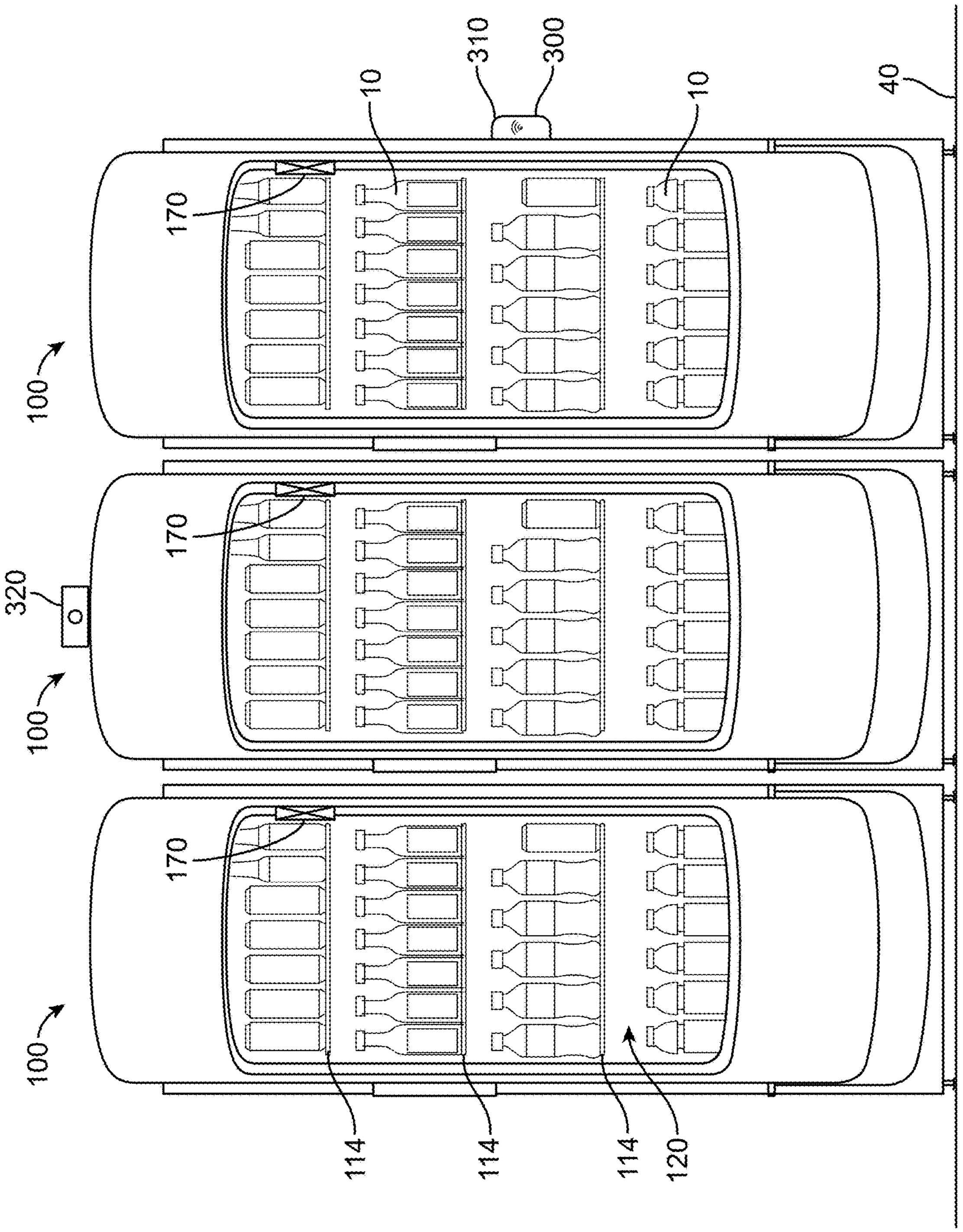
FIG. 7 is a front view of modular vending machines according to embodiments.

With reference to FIGS. 5-7, a modular vending machine 100 may be of various shapes and sizes, and may be placed and/or mounted on a variety of different support structures or surfaces. FIG. 5, for example, shows two modular vending machines 100 that are generally cubic in shape, which are placed on a table 20. In some embodiments, modular vending machines 100 may be placed on another similar elevated horizontal support surface, such as, for example, a counter, desk, stand, or the like. As shown in FIG. 6, for example, modular vending machines 100 may also be mounted to wall 30, or other similar vertical support structure. As shown in FIG. 7, for example, modular vending machine 100 may have a generally rectangular prismatic shape, and may be placed on and supported by the ground 40. Modular vending machines may have other shapes as well which are not shown in the figures such as, for example, cylindrical or conical. In some embodiments, modular vending machines may have shapes that tessellate such that the machines may be, for example, stacked together vertically and/or horizontally as described in further detail below. In some embodiments modular vending machine 100 may be between approximately 1 and 10 cubic feet in volume. In some embodiments modular vending machine 100 may be between approximately 7 and 30 cubic feet in volume. The size of modular vending machine 100, however, may vary and may be chosen, for example, to suit a particular application of the machine (e.g. placement on a table, or mounted to a wall) or to suit the amount of available space for the machine.

Modular vending machines 100 as described above may be placed together in various configurations, and may be, for example, stacked or positioned adjacent to one another. In some embodiments, modular vending machines 100 may be in close proximity to one another (see, for example, FIG. 3). In some embodiments, modular vending machines 100 may be spatially separated from one another (see, for example, FIG. 6).

Figure 10:
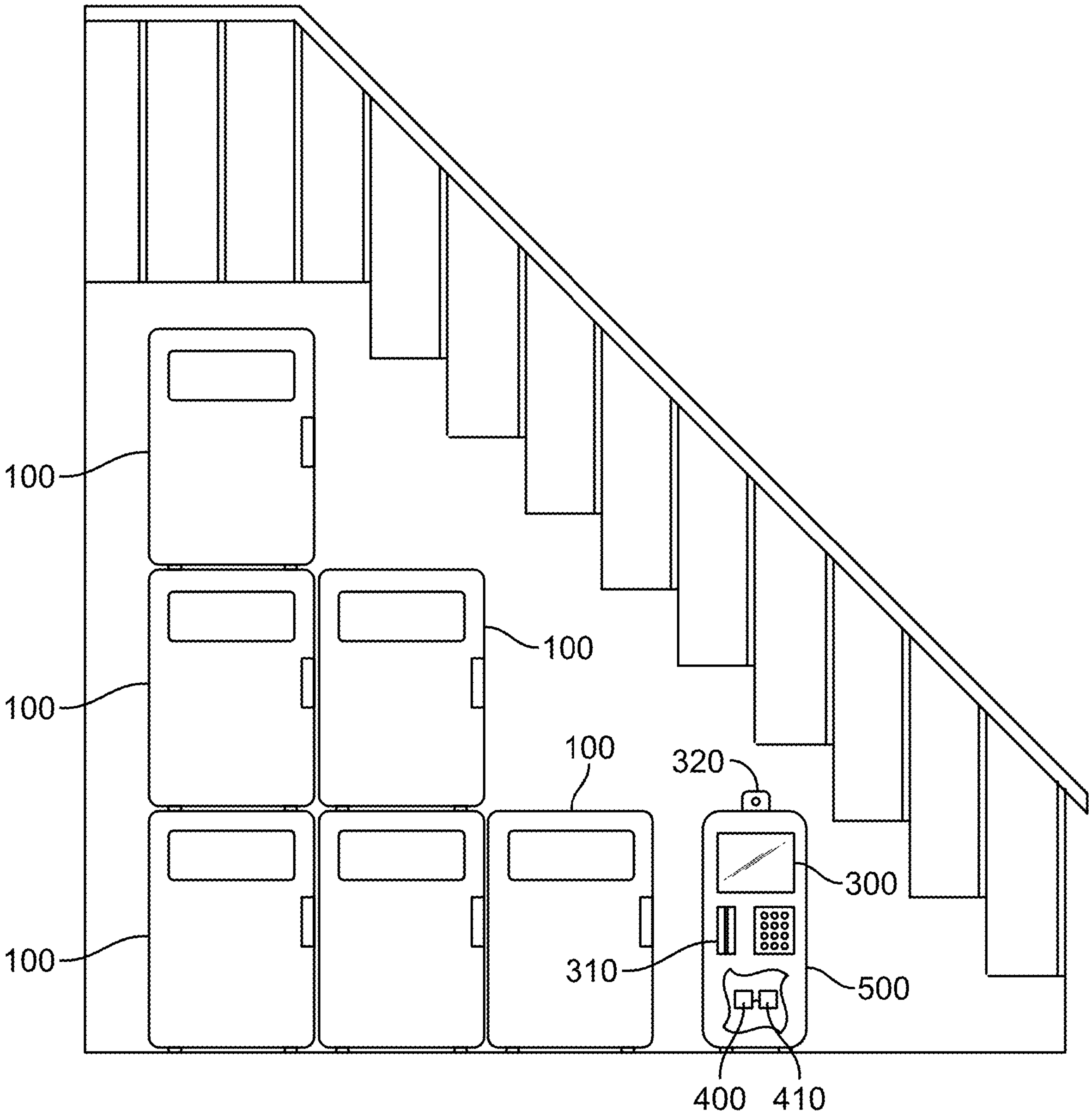
FIG. 10 is a front view of modular vending machines according to embodiments.

As shown in FIG. 3, two or more modular vending machines 100 may be stacked together in a column. Likewise, two or more modular vending machines 100 may be disposed adjacent to one another in a row. The number of modular vending machines 100 and the positioning of the modular vending machines 100 may be selected, for example, based on the space that is available for the vending machines and/or the amount of product storage space needed to accommodate consumer demand. As shown in FIG. 10, for example, several columns of modular vending machines 100 of various heights may be placed adjacent to one another in order to more efficiently utilize the available space. Any number of modular vending machines 100 may be placed together in any arrangement, and may include any number of rows and columns of various or uniform lengths.

In some embodiments, each of the modular vending machines 100 may face in the same direction. However, in some embodiments, modular vending machines 100 may face in various directions. For example, FIGS. 4A and 4B show a column of three vending machines, where the top and bottom modular vending machines 100 face in the same direction, and the middle modular vending machine 100 is turned 90 degrees relative to the top and bottom modular vending machines 100. In some embodiments, one or more modular vending machines 100 that are stacked together in a column may face in opposite directions. In configurations where modular vending machines 100 face in more than one direction, several user may be able to stand in front of and/or interact with the column of modular vending machines 100 at once. Such arrangements may also provide greater visibility of products in the modular vending machines, which may attract more customers. As shown in FIG. 4A for example, advertisements, graphics, or the like may be placed on a side 103 of modular vending machine 100, which may also attract more customers.

With reference to FIGS. 3-4B, in some embodiments, modular vending machine 100 may include a locking system 180 configured to align, connect, and/or secure two or more modular vending machines together. In some embodiments, locking system 180 may include connection members 184 and receptacles 186. Connection members 184 may be, for example, pins, linkages, arms, cables, or other means for connecting and/or aligning modular vending machines 100 together. Receptacles 186 may be, for example, holes, slots, recesses, or the like, that are configured to receive connection members 184. In some embodiments, receptacles 186 may be disposed on the top 104 of modular vending machine 100. In some embodiments, receptacles 186 may be disposed on one or more sides 103 of modular vending machine 100. Receptacles 186 may also be disposed on other portions of the exterior surface 106 of modular vending machine 100. In some embodiments, locking system 180 may be a tongue and groove system.

In some embodiments, one end of a connection member 184 may be connected to a receptacle 186 on one modular vending machine 100, and the other end of the connection member 184 may be connected to a receptacle 186 on another modular vending machine 100, thus securing the two modular vending machines together. As shown in FIG. 3, for example, connection members 184 may extend between two adjacent modular vending machines 100, securing the modular vending machines together in a row. In some embodiments, feet 182 may also be configured to fit into receptacles 186 in a manner similar to connection members 184. As shown in FIGS. 3-4B, for example, feet 182 may extend beneath the bottom 105 of one modular vending machine 100 and may connect to the receptacles 186 on the top 104 of another modular vending machine 100, thus securing the modular vending machines 100 together in a column. In some embodiments, connection members 184, rather than feet 182, may be used to secure modular vending machines 100 together in a column. In some embodiments, connection members 184 and/or feet 182 may include a locking mechanism configured to lock the connection member 184 into its respective receptacle(s).

In some embodiments, two or more modular vending machines 100 may be connected together through a wireless or wired connection and may act as a system. As described in detail above, each modular vending machine 100 may connect to a network 600 where modular vending machine 100 may communicate with user mobile device 700 and/or administrator device 800. One modular vending machine 100 may also communicate with another modular vending machine 100 over network 600. In some embodiments, modular vending machines 100 may communicate with each other or connect to network 600 via transceivers 410. In some embodiments, modular vending machines 100 may communicate with each other or connect to network 600 via a wired connection such as, for example, Ethernet cables. In some embodiments, connection members 184 may include wiring, connection ports, or the like, for example, to allow for the transmission of data and/or power between modular vending machines 100.

Figure 11:
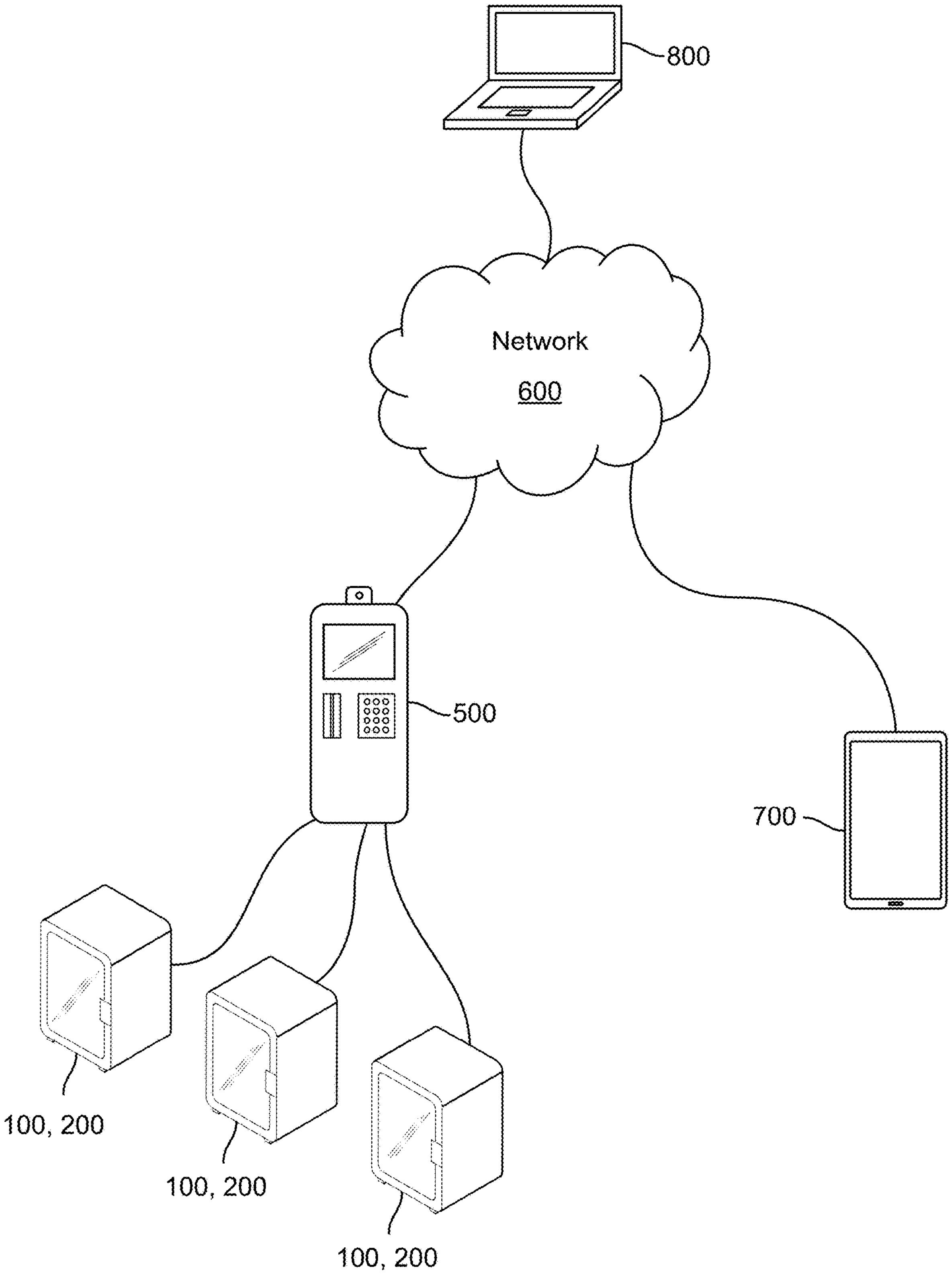
FIG. 11 depicts an exemplary network environment suitable for use and interconnection of exemplary components described herein, according to embodiments.

In some embodiments, each modular vending machine 100 in a system of modular vending machines 100 may include a control unit 400 that controls its own functions. In some embodiments, one control unit 400 may control the functions of several modular vending machines 100. Similarly, each modular vending machine 100 in a system of modular vending machines 100 may include a respective user interface 300, item scanner 310, and/or biometric scanner 320. However, in some embodiments, one user interface 300, item scanner 310, and/or biometric scanner 320, may be connected to and used with several modular vending machines 100 in the system (see, for example, FIGS. 3 and 7). With reference to FIGS. 10 and 11, in some embodiments, a transaction station 500 may house user interface 300 and/or control unit 400 separately from modular vending machines 100. Modular vending machines 100 may be connected to transaction station 500 via a wired or wireless connection. As exemplified in FIG. 11, in some embodiments, transaction station 500 may be connected to network 600 and act as a hub for a number of modular vending machines 100 that are servicing a particular area.

In some embodiments, a user may interact with multiple modular vending machines 100 at once and/or purchase products from multiple modular vending machines 100 in one transaction. During a vending operation according to some embodiments, for example, a user may approach a system of modular vending machines 100. The user may be required to provide payment information and/or verify his/her identity using user interface 300, item scanner 310, and/or user mobile device 700. Similarly, the identity of the user may be automatically verified by biometric scanner 320. After the payment information and/or identity information has been confirmed, two or more of the products doors 130 may be unlocked, and the user may access the respective product compartments 120. Then, the user may remove products 10 from the product compartments 120 of two or more modular vending machines 100 and complete a single transaction based on the products removed from the several product compartments. In this manner, the user is not required to separately obtain access to each vending machine, and may complete only one transaction when purchasing products from different modular vending machines.

Each of the modular vending machines 100 in the system of modular vending machines need not be of identical construction or contain the same type of products 10. For example, one modular vending machine 100 in the system may contain only perishable products 10 and may include a temperature control system 150, and another modular vending machine 100 in the system may contain only non-perishable products 10 and may not be temperature controlled. In some embodiments, each of the modular vending machines 100 in the system of modular vending machines is of identical construction.

In some embodiments, one modular vending machine 100 may contain products 10 that are age-restricted such as, for example, alcoholic beverages or tobacco, and another modular vending machine 100 may contain products 10 that are not age-restricted. During a vending operation according to some embodiments, before unlocking product doors 130, a user may be required to confirm his/her age, for example, by verifying his/her identity using item scanner 310 or biometric scanner 320, or by logging into an account on user mobile device 700. In some embodiments, item scanner 310 may be configured to scan and/or validate a user's identity card such as, for example, a driver's license, passport, or the like. After the user's age has been determined, the appropriate product doors 130 may then be unlocked. For example, if a user is old enough to purchase all products 10 that are contained in the modular vending machines 100, then all product doors 130 may be unlocked. If a user is too young to purchase certain types of products 10, then the product doors 130 securing the age-restricted products 10 may remain locked while the product doors 130 securing the non-age-restricted products 10 may be unlocked. Then, the user may remove and provide payment for the products 10 in the unlocked product compartments 120.

As described above, control unit 400 and/or administrator device 800 may store product information, transaction history, and/or user information. This stored information may be used, for example, to make product recommendations to users. After a user approaches the modular vending machines 100 and the user's identity has been confirmed, lights 190, user interface 300, and/or user mobile device 700 may indicate products 10 that the user has purchased in the past, or indicate products 10 that the user might like based on past transactions. Lights 190, user interface 300, and/or user mobile device 700 may indicate to the user the location in the product compartment(s) 120 of the recommended product(s) 10. Similarly, lights 190, user interface 300, and/or user mobile device 700 may indicate and/or notify the user of products 10 that contain ingredients that the user is allergic to, for example, or ingredients that are not consistent with the user's dietary restrictions or preferences. In some embodiments, the product doors 130 securing product compartments 120 containing products 10 that are not consistent with the user's dietary restrictions or preferences, or that contain known allergens, may remain locked while the other product doors 130 are unlocked.

In some embodiments, product removal sensors 170 may monitor, continuously or several times during a transaction, the number of products removed and/or the value of the products removed. Further, control unit 400 may limit the number of product doors 130 that may be opened at once during a transaction. This may be used, for example, to prevent a large quantity or value of products from being removed from the modular vending machines 100 before a transaction has been completed. In some embodiments, the operator of the machines may manually select an acceptable limit of the quantity and/or value of the products that may be removed during one transaction. In some embodiments, the acceptable limit of the quantity and/or value of the products may be automatically determined, for example, by control unit 400 and/or administrator device 800.

During a vending operation according to some embodiments, after a user has provided payment information and/or his/her identity has been verified, certain product doors 130 may be unlocked. After a user opens one of the product doors 130, all of the other product doors 130 may then be locked. Then, after the opened door has been shut, product removal sensors 170 may determine the quantity and/or value of the products removed from the product compartment 120. If the quantity and/or value does not exceed the acceptable limit, then the other product doors 130 may unlock such that the user may continue removing products. If the type, quantity, and/or value exceeds the acceptable value, then the other the product doors 130 may remain locked, and the user may not be allowed to remove more products from other compartments. In some embodiments, the user may be notified that he/she has exceeded the allowance, for example, via user interface 300 and/or user mobile device 700. The user may then be allowed to return products 10 to the product compartment 120 from which they were taken such that the outstanding value drops below the allowable limit. Alternatively, the user may then provide payment for the products and complete the transaction.

Figure 12:
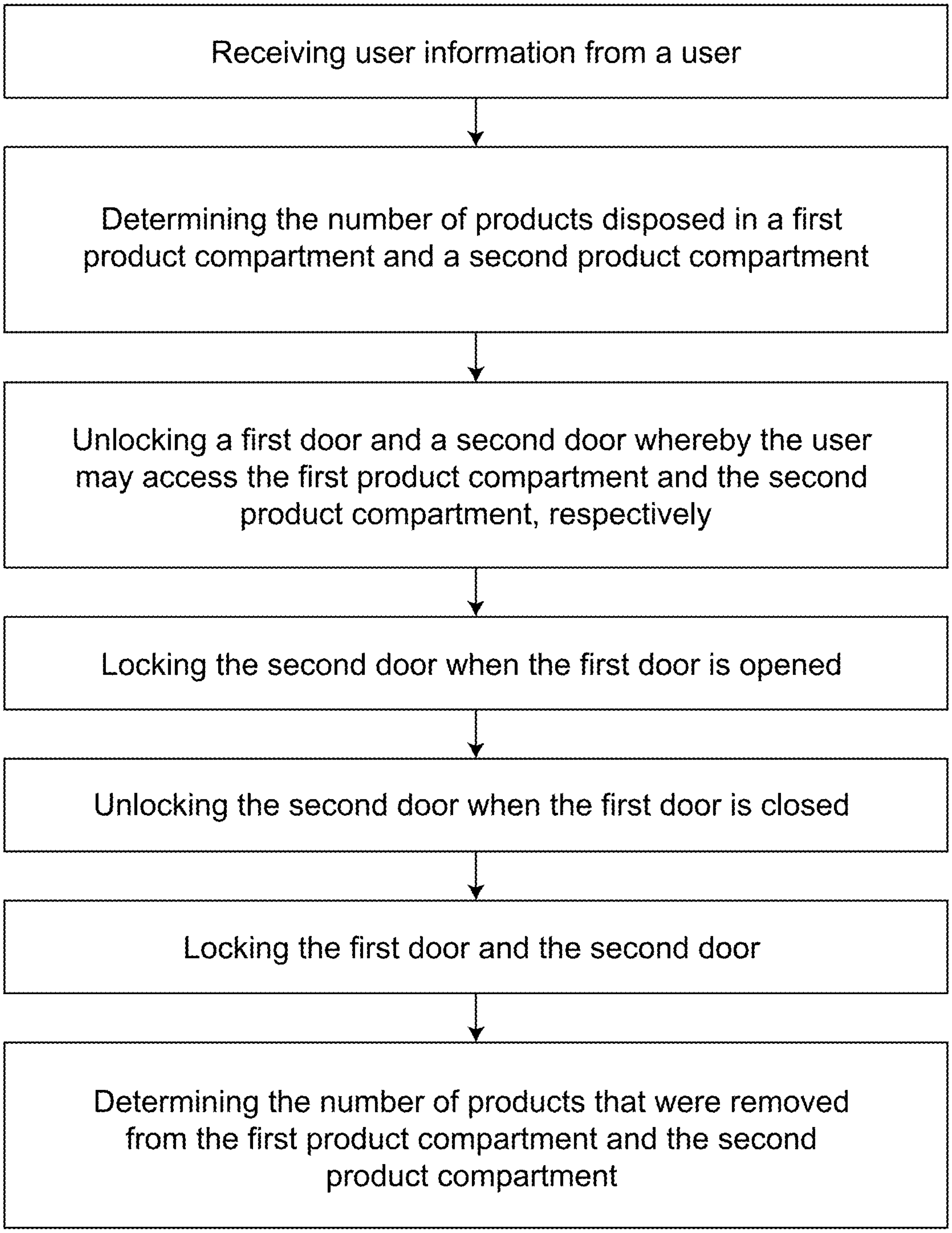
FIG. 12 is a block diagram showing the steps of a method of using a modular vending machine according to embodiments.

As exemplified in FIG. 12, a vending operation may include: receiving user information from a user; determining the number of products 10 disposed in a first product compartment 120 and in a second product compartment 120; unlocking a first product door 130 and a second product door 130; locking the second product door 130 when the first product door 130 is opened by a user; unlocking the second product door 130 when the first product door 130 is closed; locking the first and second product doors 130; and determining the number of products 10 that were removed from the first product compartment 120 and the second product compartment 120.

Figure 8:
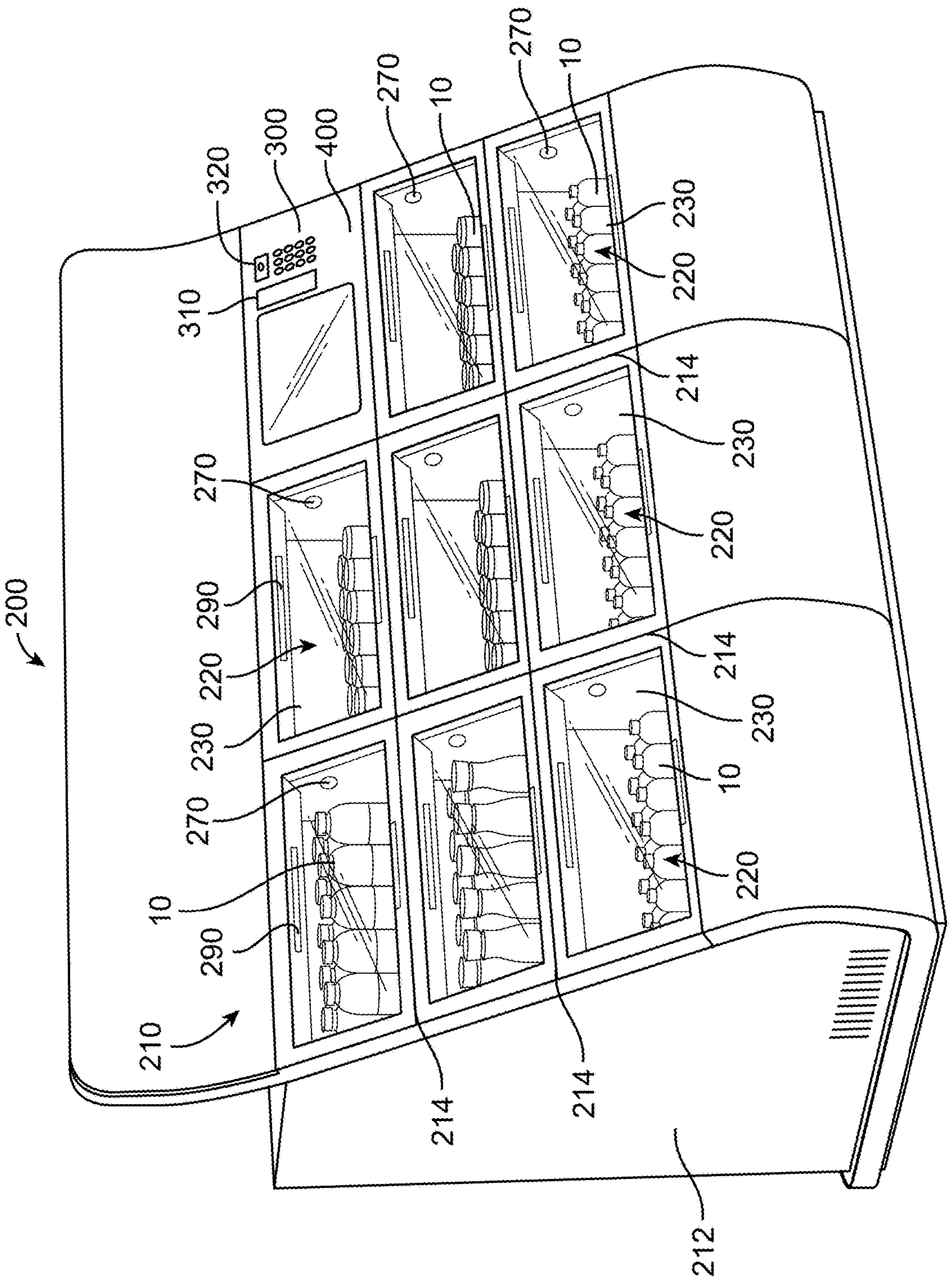
FIG. 8 is a front perspective view of a modular vending machine according to embodiments.

With reference to FIG. 8, a modular vending machine 200 may include a product storage system 210. Product storage system 210 is configured to store and/or display one or more products 10 to be vended to a user. Product storage system 210 may include several product compartments 220 which are housed together in one integral housing 212. Product compartments 220 may be separated by compartment walls 214, which may be insulated to reduce the exchange of heat between adjacent product compartments 220. Products 10 may be placed and/or stored within product compartments 220. In some embodiments, product storage system 210 may include lights 290 configured to illuminate product compartments 220 or a portions of product compartments 220.

In some embodiments, each product compartment 220 may store different kinds of products 10. For example, non-perishable products 10 may be stored in one product compartment 220, and perishable products 10 may be stored in another product compartment 220. In some embodiments, products 10 that are preferably served at a temperature other than room temperature may be stored in one product compartment 220, and products 10 that are preferably served at room temperature may be stored in another product compartment 220. In some embodiments, all of the products 10 stored in product compartment 220 may be of the same type, weight, volume, and/or cost.

In some embodiments, modular vending machine 200 may include a temperature control system for controlling the temperature of some or all of product compartments 220. The temperature control system may have the same features and may operate in the same manner as temperature control system 150 described above.

Products 10 that are stored in product storage system 210 may be arranged into rows, columns, and/or stacks within product compartment 220. In some embodiments, products 10 need not be organized in a particular manner and may be placed in product storage system 210 in various arrangements.

Modular vending machine 200 may include a product door 230 for each product compartment 220 whereby a user may access product compartment 220 and products 10 during a vending operation. As with product door 130, product door 230 may be selectively accessible by a user during a vending operation. Product storage system 210 may include one or more product removal sensors 270, which may have the same features and may operate in the same manner as product removal sensors 170 described above.

Modular vending machine 200 may also include a user interface 300 and control unit 400 as described in detail above. As exemplified in FIG. 9, modular vending machine 200 may connect to network 600 and communicate with user mobile device 700 and/or administrator device 800 in the manner described above with regard to modular vending machine 100.

Modular vending machine 200 may perform vending operations and/or complete transaction with users in the same manner as described above with regard to a system of modular vending machines 100. For example, in some embodiments, product removal sensors 270 may monitor, continuously or several times during a transaction, the number of products removed from product compartments 220 and/or the value of the products removed. Further, control unit 400 may limit the number of product doors 230 that may be opened at once during a transaction. This may be used, for example, to prevent a large quantity or value of products from being removed from the modular vending machine 200 before a transaction has been completed. In some embodiments, the operator of the machine may manually select an acceptable limit of the quantity and/or value of the products that may be removed during one transaction. In some embodiments, the acceptable limit of the quantity and/or value of the products may be automatically determined, for example, by control unit 400 and/or administrator device 800.

During a vending operation according to some embodiments, after a user has provided payment information and/or his/her identity has been verified, certain product doors 230 may be unlocked. After a user opens one of the product doors 230, all of the other product doors 230 may then be locked. Then, after the opened door has been shut, product removal sensors 270 may determine the quantity and/or value of the products removed from the product compartment 220. If the quantity and/or value does not exceed the acceptable limit, then the other product doors 230 may unlock such that the user may continue removing products. If the type, quantity, and/or value exceeds the acceptable value, then the other the product doors will remain locked, and the user will not be allowed to remove more products from other compartments. In some embodiments, the user may be notified that he/she has exceeded the allowance, for example, via user interface 300 and/or user mobile device 700. The user may then be allowed to return products 10 to the product compartment 220 from which they were taken such that the outstanding value drops below the allowable limit. Alternatively, the user may then provide payment for the products and complete the transaction.

As described above with regard to modular vending machines 100, modular vending machine 200 may also make recommendations to users based on past transaction data, or may restrict access to certain product compartments based on age and/or dietary restrictions.

As exemplified in FIG. 12, a vending operation may include: receiving user information from a user; determining the number of products 10 disposed in a first product compartment 220 and in a second product compartment 220; unlocking a first product door 230 and a second product door 230; locking the second product door 230 when the first product door 230 is opened by a user; unlocking the second product door 230 when the first product door 230 is closed; locking the first and second product doors 230; and determining the number of products 10 that were removed from the first product compartment 220 and the second product compartment 220.

Figure 13:
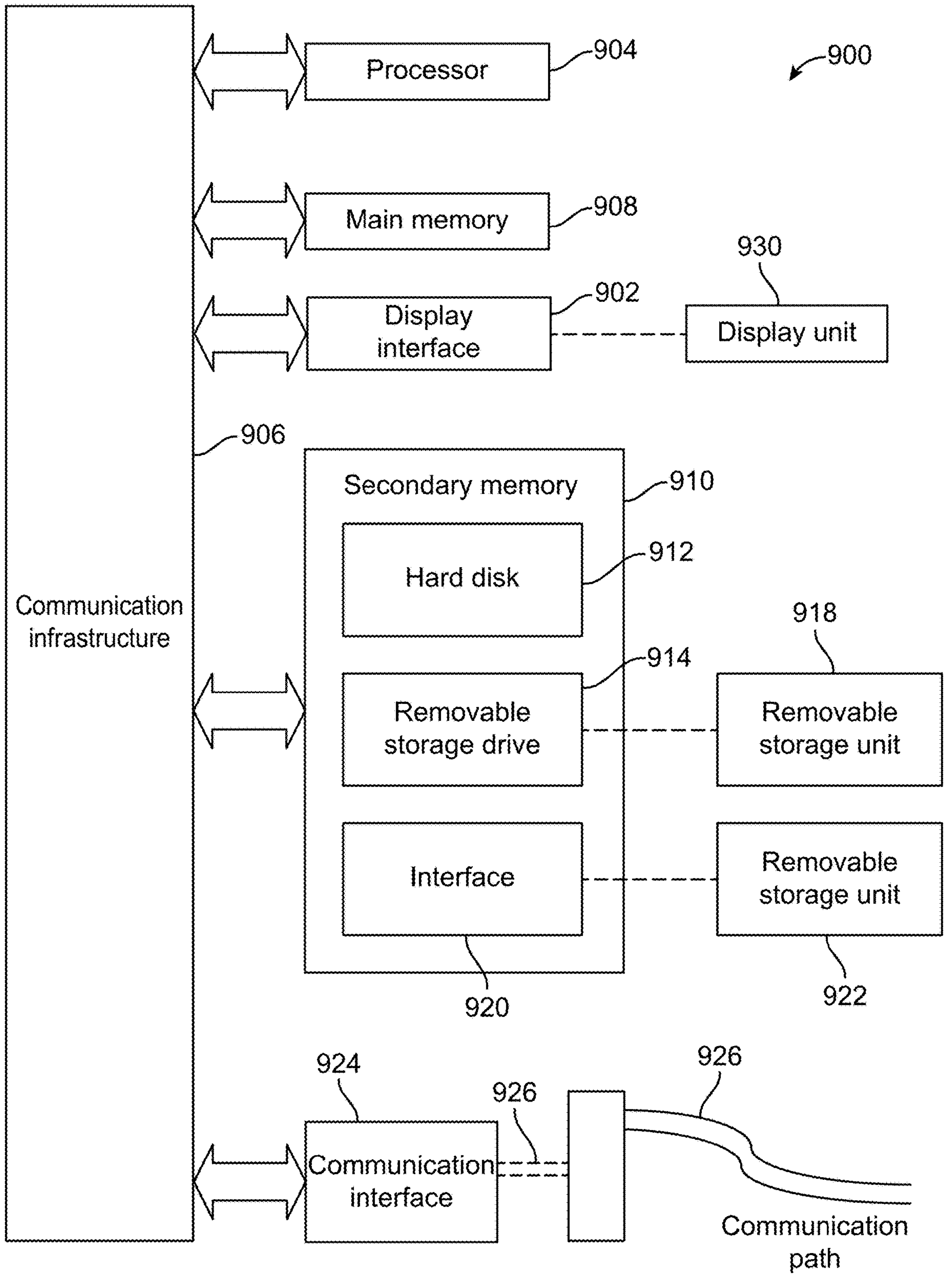
FIG. 13 is a schematic block diagram of an exemplary computer system in which embodiments may be implemented.

FIG. 13 illustrates an exemplary computer system 900 in which embodiments, or portions thereof, may be implemented as computer-readable code. For example, collection of customer data (e.g., biometric data), identification of a customer based on collected data, authentication of customer accounts, and/or tracking of customer accounts may be implemented in computer system 900 using hardware, software, firmware, tangible computer readable media having instructions stored thereon, or a combination thereof and may be implemented in one or more computer systems or other processing systems. Controllers discussed herein may be computer systems having all or some of the components of computer system 900 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 900. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, or removable storage drive 914. Removable storage drive 914 may include a floppy disk drive, a magnetic tape drive, an optical disk drive, a flash memory, or the like. The removable storage drive 914 reads from and/or writes to a removable storage unit 918 in a well-known manner. Removable storage unit 918 may include a floppy disk, magnetic tape, optical disk, a universal serial bus (USB) drive, etc. which is read by and written to by removable storage drive 914. As will be appreciated by persons skilled in the relevant art, removable storage unit 918 includes a computer usable storage medium having stored therein computer software and/or data.

Computer system 900 (optionally) includes a display interface 902 (which can include input and output devices such as keyboards, mice, etc.) that forwards graphics, text, and other data from communication infrastructure 906 (or from a frame buffer not shown) for display on display unit 930.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communication interface 924. Communication interface 924 allows software and data to be transferred between computer system 900 and external devices. Communication interface 924 may include a modem, a network interface (such as an Ethernet card), a communication port, a PCMCIA slot and card, or the like. Software and data transferred via communication interface 924 may be in the form of signals, which may be electronic, electromagnetic, optical, or other signals capable of being received by communication interface 924. These signals may be provided to communication interface 924 via a communication path 926. Communication path 926 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communication interface 924. Such computer programs, when executed, enable computer system 900 to implement the embodiments as discussed herein. In particular, the computer programs, when executed, enable processor device 904 to implement the processes of the embodiments discussed here. Accordingly, such computer programs represent controllers of the computer system 900. Where the embodiments are implemented using software, the software may be stored in a computer program product and loaded into computer system 900 using removable storage drive 914, interface 920, and hard disk drive 912, or communication interface 924.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A modular vending system, comprising:

a first modular vending unit, comprising:

- a first product compartment having a first locking mechanism that is operably accessible to a user through a first door,
- a first product sensor configured to determine the number of products disposed in the first product compartment,
- a user interface configured to receive user information, and
- a connection member; and a second modular vending unit, comprising:

- a second product compartment having a second locking mechanism that is operably accessible to a user through a second door,
- a second product sensor configured to determine the number of products disposed in the second product compartment, and
- a connection receptacle, wherein the connection member is configured to connect with the connection receptacle to removably secure the first modular vending unit with the second modular vending unit and to communicate at least one of data or power between the first modular vending unit and the second modular vending unit, and wherein the connection member is configured to support the first modular vending unit above a supporting surface when not connected with the connection receptacle.

2. The modular vending system of claim 1, wherein only one of the first and second doors may be opened at a time.

3. The modular vending system of claim 1, wherein the second modular vending unit further comprises a second user interface, wherein when user information is received by the second user interface of the second modular vending unit, both the first and second doors are unlocked.

4. The modular vending system of claim 1, wherein the user information received by the user interface is a machine readable item.

5. The modular vending system of claim 1, wherein the user information received by the user interface is a biometric characteristic.

6. A modular vending machine, comprising:

a first modular vending unit comprising a first product compartment and a connection member;

a second modular vending unit comprising a second product compartment separate from the first product compartment and a connection receptacle, wherein the connection member is configured to connect with the connection receptacle to removably secure the first modular vending unit with the second modular vending unit and to communicate at least one of data or power between the first modular vending unit and the second modular vending unit, and wherein the connection member is configured to support the first modular vending unit above a supporting surface when not connected with the connection receptacle;

a first locking mechanism configured to automatically lock and unlock a first door of the first product compartment;

a second locking mechanism configured to automatically lock and unlock a second door of the second product compartment;

a user interface configured to receive user information corresponding to a user identity; and a product sensor system configured to determine the number of products disposed in the first and second product compartments, wherein during a vending operation, both the first and the second product compartments are accessible to a user through the first and second doors, respectively, wherein only one of the first and second doors may be opened at a time.

7. The modular vending machine of claim 6, wherein during the vending operation, a transaction is completed with the user.

8. The modular vending machine of claim 6, wherein the user interface is configured to receive the user information via a user mobile device.

9. The modular vending machine of claim 6, wherein the first and second product compartments are disposed together in an integral housing.

10. The modular vending system of claim 1, wherein the first modular vending unit further comprises a light configured to illuminate when the first door is unlocked.

11. The modular vending machine of claim 6, wherein the user information comprises an age of the user.

12. The modular vending machine of claim 6, wherein the user information comprises dietary restrictions of the user.

13. The modular vending machine of claim 6, further comprising a control unit configured to determine based on the user information to unlock the first locking mechanism and to not unlock the second locking mechanism.

14. A modular vending system, comprising:

a plurality of modular vending units, wherein each modular vending unit comprises:

a housing defining a product storage compartment, a product removal sensor arranged within the housing, a control unit configured to determine an amount and identity of products removed from the product storage compartment based on information from the product removal sensor, a connection member, and a connection receptacle, wherein each of the plurality of modular vending units are movable with respect to one another such that the plurality of modular vending units can be arranged in a plurality of configurations, wherein the connection member is configured to connect with the connection receptacle of another modular vending unit to removably secure the plurality of modular vending units together and to communicate at least one of data or power among the plurality of modular vending units, and wherein the connection member is configured to support the modular vending unit above a supporting surface when not connected with the connection receptacle of another modular vending unit; and a remote administrator in wireless communication with each of the plurality of modular vending units via a network, such that the remote administrator is configured to process a transaction based on removal of products from one or more of the plurality of modular vending units.

15. The modular vending system of claim 14, wherein the remote administrator comprises a list of products available in the plurality of modular vending units.

16. The modular vending system of claim 1, wherein the first modular vending unit and the second modular vending unit are stackable.

17. The modular vending system of claim 1, wherein the first modular vending unit and the second modular vending unit are configured to communicate with each other over a network.

18. The modular vending system of claim 1, wherein during a vending operation, the first and second product sensors automatically determine the number of products removed from the first and second product compartments and a transaction is completed with the user.

19. The modular vending machine of claim 13, wherein the control unit is configured to receive an indication from a mobile electronic device to complete a transaction.

* * * * *